Patented Mar. 31, 1925.

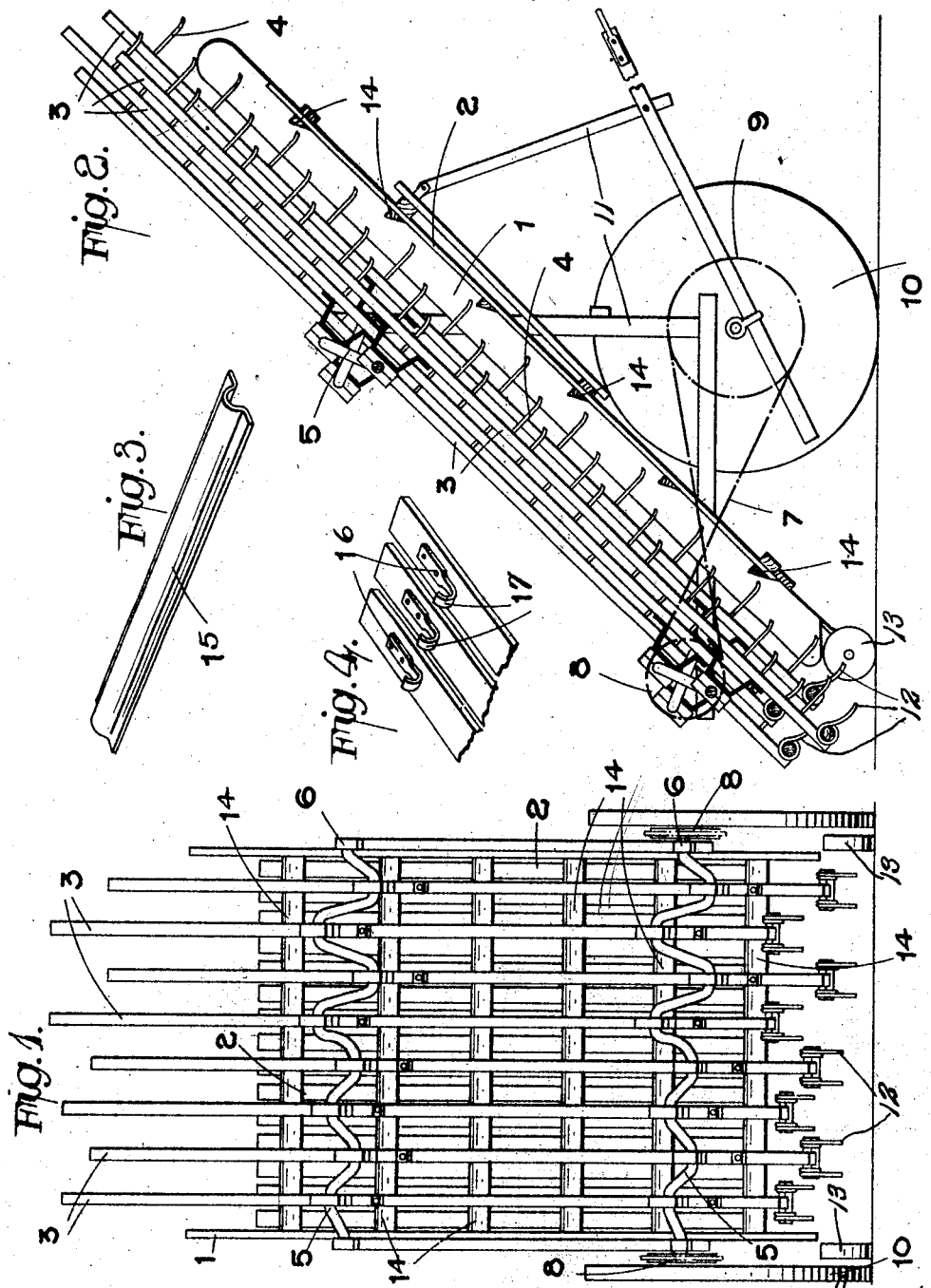

1,532,022

UNITED STATES PATENT OFFICE.

JOSEPH BAMFORD AND CYRIL JOSEPH BAMFORD, OF UTTOXETER, ENGLAND.

HAY-LOADER.

Application filed July 7, 1924. Serial No. 724,626.

*To all whom it may concern:*

Be it known that we, JOSEPH BAMFORD and CYRIL JOSEPH BAMFORD, subjects of the King of Great Britain, residing at St. Mary's Mount, Uttoxeter, in the county of Stafford, England, and The Parks, Uttoxeter, aforesaid, respectively, have invented certain new Improvements in Hay-Loaders; and we do hereby declare the following to be a full, clear, and exact description of the same.

This invention has reference to hayloaders, particularly to the type which have a plurality of rake-carrying rods co-acting with an inclined trough or chute and provided with means whereby as the machine moves over the ground, the rake carrying rods which extend from the ground to the top of the trough or chute are given a general reciprocating or rotary movement over the ground and towards or from the trough or chute, or a combined reciprocating and rotary movement.

The object of the present invention is to provide an improved construction of machine which will be simple to manufacture and will at the same time effectively collect the crop from the ground and convey it to a cart or wagon.

Referring to the drawings:—

Figure 1 is a rear elevation of a hayloader according to this invention.

Figure 2 is a vertical section of same.

Figure 3 is a detail view of a modified construction.

Figure 4 is a similar view of a further modified construction.

In the construction illustrated by Figures 1 and 2 of the accompanying drawings, the hayloader comprises an inclined chute 1 formed of a number of longitudinally arranged wood or other strips 2, up which the hay is adapted to be conveyed by a series of reciprocating bars or rods 3 to which downwardly projecting tines 4 are rigidly secured. The bars or rods 3 are driven by a series of cranks 5, which in turn are mounted in bearings 6 and are operated by a chain 7 and sprocket wheel 8 arranged on each side of the machine.

The chains 7 are driven by two sprocket wheels 9 of large diameter which are mounted adjacent two road wheels 10 associated with an underframe 11 supporting the chute.

The lower ends of the rods or bars 3 project beyond the lower end of the chute when in their lowest position, and are each provided with two downwardly projecting tines 12 which pick the crop off the ground. These tines 12 are resiliently mounted one on each side of the rods 3 by means of coils provided at their upper ends, so that should their lower or operative ends contact with the ground, they will not be broken. The lower end of the chute is provided with a small road wheel 13 on either side in order to keep this part of the machine a regular height from the ground and ensure that the crop will be efficiently picked up.

The two crank shafts 5 are formed by first bending the material in each case to form four pairs of cranks, adjacent cranks being arranged at 180° to each other and all the cranks originally being in the same plane. We then give each element a twist preferably at the centre, through 90° so that on each side of the centre there are two pairs of cranks, the cranks of each pair being at 180° to one another. It is not essential that the twist be given at the centre and if required a twist through about 90° may be given at more than one point along the length of the crank element.

We find that it is advantageous to use a crank arrangement in which adjacent cranks are arranged at 180° to each other as compared with an arrangement in which adjacent cranks are at only 120° to each other as the crop or material is less liable to be damaged. Further, the particular construction of crank described above is one which it is simple to manufacture as compared with a three-throw in which adjacent cranks are at 120°.

The longitudinally arranged strips 2 of wood or other material forming the bottom or bed of the chute are provided upon their upper surfaces with a series of transversely arranged strips 14. These strips 14 of wood or other material are of wedge shape, the widest portion of the wedge being at the top, and are suitably spaced apart along the length of the bottom of the chute. By forming these strip members of wedge shape, they offer very little resistance to the passage of the hay in an upward direction, whilst the hay is effectively prevented from sliding down the chute.

In the modified construction shown by Figure 3, the transverse strips 15 are of a corrugated sheet metal construction and are adapted to be secured to the chute by screws or in any other suitable manner. If desired, the transverse members may be of sheet metal and may be of wedge or any other suitable shape.

In the further modified construction shown by Figure 4, the longitudinally arranged strips 2 forming the bottom of the chute are provided with a series of hook members 16. These hook members 16 are similarly spaced as in the previously described constructions and have their extreme pointed ends 14 arranged upwardly so as to offer very little resistance to the passage of the hay in an upward direction but will effectively prevent it from sliding downwardly.

In any of the previously described constructions the hook members or transverse strips may be arranged in any suitable manner to attain the effect desired and they may be of any suitable shape.

What we claim then is:—

A hayloader comprising an inclined chute, transversely arranged projections on the upper surface of said chute, an underframe supporting said chute, road wheels associated with said underframe, road wheels at the lower end of said chute and on either side thereof, crank shafts mounted across the upper side of the chute, the cranks of said crank shafts being arranged in groups wherein the adjacent cranks of each group are set at 180° to each other and the groups are set at right angles to each other, gearing for transmitting rotary motion from one of said road wheels to one of said crank shafts, a plurality of rods mounted on said crank shafts, a plurality of downwardly projecting tines rigidly mounted on each of said rods, said rods when in their lowest positions extending below the lower end of the chute, and two downwardly projecting tines resiliently mounted on the lower end of each of said rods.

In witness whereof we affix our signatures.

JOSEPH BAMFORD,
CYRIL JOSEPH BAMFORD.